United States Patent
Cheng et al.

(10) Patent No.: US 9,876,669 B2
(45) Date of Patent: Jan. 23, 2018

(54) MOBILE COMPUTING RESOURCE

(71) Applicant: ICE Computer, Inc., Saratoga, CA (US)

(72) Inventors: Shang-Che Cheng, Saratoga, CA (US); Catherine Cheng, Saratoga, CA (US)

(73) Assignee: ICE COMPUTER, INC., Saratoga, CA (US)

( * ) Notice: Subject to any disclaimer, the term of this patent is extended or adjusted under 35 U.S.C. 154(b) by 165 days.

(21) Appl. No.: 14/708,790

(22) Filed: May 11, 2015

(65) Prior Publication Data

US 2015/0326659 A1 Nov. 12, 2015

Related U.S. Application Data (60) Provisional application No. 61/991,619, filed on May 12, 2014.

(51) Int. Cl.
| | |
|---|---|
| *H04L 29/08* | (2006.01) |
| *H04L 29/06* | (2006.01) |
| *H04W 12/06* | (2009.01) |
| *G06F 13/38* | (2006.01) |
| *G06F 1/16* | (2006.01) |

(52) U.S. Cl.
CPC ............ *H04L 29/06* (2013.01); *G06F 1/16* (2013.01); *G06F 13/385* (2013.01); *H04L 29/08* (2013.01); *H04L 63/0876* (2013.01); *H04L 67/1091* (2013.01); *H04L 67/1095* (2013.01); *H04W 12/06* (2013.01)

(58) Field of Classification Search
CPC ......... H04L 29/06; H04L 29/10; H04L 29/08; H04L 63/0875; H04L 63/1091; H04L 67/1095; H04L 67/1091; H04L 63/0876; G06F 1/163; G06F 13/385; H04W 12/06

USPC ....................................................... 713/170
See application file for complete search history.

(56) References Cited

U.S. PATENT DOCUMENTS

| | | |
|---|---|---|
| 6,489,932 B1 | 12/2002 | Chitturi et al. |
| 6,538,880 B1 | 3/2003 | Kamijo et al. |

(Continued)

FOREIGN PATENT DOCUMENTS

CN 201387605 Y 1/2010

OTHER PUBLICATIONS

Second Office Action for Chinese Patent Application 201180043616.1, dated Jan. 29, 2016, 7 pages.

(Continued)

*Primary Examiner* — Kambiz Zand
*Assistant Examiner* — Tongoc Tran
(74) *Attorney, Agent, or Firm* — VLP Law Group, LLP; Edward C. Kwok (57) ABSTRACT

A high-performance handheld mobile computing resource need not be provided a display or any peripheral devices to augment the performance of a client device. The mobile computing resource may include a motherboard, a central processing unit (CPU), a read-only memory (ROM), a random access memory (RAM), a basic input/output system (BIOS), and an operating system (OS). A wireless module may be provided to enable wireless services. A power module may be provided to allow the mobile computing resource to serve as a power source. The mobile computing resource may serve as local cloud computation and storage resources to the client device, or as a remote desktop computer.

32 Claims, 8 Drawing Sheets

(56) References Cited

U.S. PATENT DOCUMENTS

| | | | |
|---|---|---|---|
| 6,636,918 B1 | 10/2003 | Aguilar et al. | |
| 6,697,032 B2* | 2/2004 | Chitturi | G06F 1/1601 345/158 |
| 6,697,251 B1* | 2/2004 | Aisenberg | G06F 1/1616 248/118.1 |
| 6,822,635 B2 | 11/2004 | Shahoian et al. | |
| 7,120,462 B2 | 10/2006 | Kumar | |
| 7,136,282 B1 | 11/2006 | Rebeske | |
| 7,266,774 B2 | 9/2007 | Jones | |
| 7,543,099 B2 | 6/2009 | Han | |
| 7,624,210 B2 | 11/2009 | Izutsu | |
| 7,831,276 B2 | 11/2010 | Kumar | |
| 8,035,963 B2 | 10/2011 | Ladouceur et al. | |
| 8,041,300 B2 | 10/2011 | Dorogusker et al. | |
| 8,072,392 B2 | 12/2011 | Lection | |
| 8,081,170 B2 | 12/2011 | Ko et al. | |
| 8,390,583 B2 | 3/2013 | Forutanpour et al. | |
| 8,432,362 B2 | 4/2013 | Cheng et al. | |
| 8,506,085 B2 | 8/2013 | Azor et al. | |
| 8,624,841 B2 | 1/2014 | Kim et al. | |
| 8,850,610 B2 | 9/2014 | Johnson | |
| 9,083,812 B2 | 7/2015 | Ryan | |
| 9,442,526 B2* | 9/2016 | Rosenberg | G06F 1/1632 |
| 2002/0091877 A1* | 7/2002 | Karidis | G06F 1/1616 710/1 |
| 2002/0103951 A1* | 8/2002 | Huber | G06F 1/1616 710/72 |
| 2003/0095105 A1 | 5/2003 | Vaananen | |
| 2003/0126335 A1* | 7/2003 | Silvester | G06F 1/1626 710/303 |
| 2004/0019724 A1 | 1/2004 | Singleton, Jr. et al. | |
| 2004/0104942 A1 | 6/2004 | Weigel | |
| 2004/0268005 A1 | 12/2004 | Dickie | |
| 2005/0013103 A1 | 1/2005 | Chandley | |
| 2005/0162336 A1 | 7/2005 | McClintock et al. | |
| 2006/0192689 A1 | 8/2006 | Wang et al. | |
| 2006/0236014 A1 | 10/2006 | Yin et al. | |
| 2008/0002355 A1 | 1/2008 | Carnevali | |
| 2008/0062625 A1 | 3/2008 | Batio | |
| 2008/0123285 A1 | 5/2008 | Fadell et al. | |
| 2008/0167014 A1 | 7/2008 | Novick et al. | |
| 2008/0214237 A1* | 9/2008 | Cupps | G06F 1/1626 455/556.2 |
| 2008/0227393 A1* | 9/2008 | Tang | H04W 8/005 455/41.3 |
| 2008/0304688 A1 | 12/2008 | Kumar | |
| 2009/0044259 A1 | 2/2009 | Bookman et al. | |
| 2009/0225035 A1 | 9/2009 | Baik | |
| 2009/0271556 A1 | 10/2009 | Rutherford, III et al. | |
| 2009/0295750 A1 | 12/2009 | Yamazaki et al. | |
| 2009/0296331 A1 | 12/2009 | Choy | |
| 2010/0007668 A1 | 1/2010 | Casparian et al. | |
| 2010/0081337 A1* | 4/2010 | Dorogusker | H01R 31/065 439/660 |
| 2010/0085382 A1 | 4/2010 | Lundqvist et al. | |
| 2010/0095041 A1 | 4/2010 | Bailey | |
| 2010/0109999 A1 | 5/2010 | Qui | |
| 2010/0137028 A1 | 6/2010 | Farris et al. | |
| 2010/0246119 A1 | 9/2010 | Collopy et al. | |
| 2010/0321275 A1 | 12/2010 | Hinckley et al. | |
| 2011/0002096 A1 | 1/2011 | Thorson | |
| 2011/0216007 A1 | 9/2011 | Cheng et al. | |
| 2011/0228463 A1 | 9/2011 | Matagne | |
| 2012/0011293 A1 | 1/2012 | Cheng et al. | |
| 2012/0084721 A1 | 4/2012 | Gimpl et al. | |
| 2012/0126745 A1 | 5/2012 | Partovi et al. | |
| 2012/0127284 A1 | 5/2012 | Bar-Zeev et al. | |
| 2012/0210034 A1 | 8/2012 | Ko | |
| 2012/0268399 A1 | 10/2012 | Cheng et al. | |
| 2012/0324562 A1 | 12/2012 | Bansal et al. | |
| 2013/0121239 A1* | 5/2013 | Hicks, III | H04W 4/12 370/328 |

OTHER PUBLICATIONS

PCT International Search Report and Written Opinion for International Patent Application No. PCT/US11/42016, dated Oct. 27, 2011, 8 pages.
Notice of Reasons for Rejection for Patent Application No. 2013-518533, dated Dec. 17, 2013, 2 pages.
PCT International Search Report for International Patent Application No. PCT/US 12/33752, dated Jul. 13, 2012, 6 pages.
Notice of Reasons for Rejection for Patent Application No. 2013-518533, 1 page.
First Office Action for Chinese Patent Application 201180043616.1, dated May 21, 2015, 8 pages.

* cited by examiner

MOBILE COMPUTING RESOURCE

CROSS REFERENCE TO RELATED APPLICATIONS

The present application is related to and claims priority of Ser. No. 61/991,619, entitled "Mobile Computing Resource," filed on May 12, 2014. The disclosure of the Copending Provisional application is hereby incorporated by reference herein in its entirety. The present application is also related to (a) U.S. patent application Ser. No. 13/168,666, filed on Jun. 24, 2011, and (b) U.S. Pat. No. 8,432,362, issued Apr. 30, 2013. The disclosures of the related U.S. patent application and U.S. patent are both hereby incorporated by reference herein.

BACKGROUND OF THE INVENTION

1. Field of the Invention

The present invention relates to smart connected devices and, more particularly, to providing handheld mobile computing resources to smart connected devices.

2. Discussion of the Related Art

There are many problems with current smart connected devices. For example, these devices each belong to a different but distinct smartphone, tablet, notebook, and desktop function. These devices notably lack flexibility, are unable to upgrade to the latest, more powerful processors, are not powerful when provided as desirable, pocket-sized thin clients, and do not provide sufficient cost-effectiveness to customers. Basically, a consumer needs a different device for each of the smartphone, tablet, notebook and desktop function, which is costly and not eco-friendly.

To support different and more powerful computing resource needs or functions, cloud computing services, remote desktops, virtual desktops, and remote displays are services that have been introduced. These devices, which provide on-demand computing resources, each have its own unique advantages and disadvantages. One common disadvantage among these approaches is that the on-demand computing resource is located at a remote site, and is most likely shared among multiple users. As a result, these resources are inconvenient and largely insecure. For example, Microsoft's Remote Desktop environments force users to use a server computer in a remote fixed location, so that the user is not able to restart the remote server desktop, in the event that the server computer goes down. In the same manner, when a remote desktop application shuts down on a client device, the action only disconnects the remote desktop application with the remote server computer, but leaves the remote computer still powered. The remote server computer typically does not provide an easy way to shut down or restart the remote computer. In addition, enterprise virtual desktops and cloud computing services are typically complex and costly. Such services require IT professionals to manage and maintain, so that their services are often unaffordable by most consumers. A remote display device, such as Google's thumb-size Chromecast device, provides a remote display function at a client device, such as a high-definition television set (HDTV). However, the remote display device is required to be physically connected to the client device, which is typically not battery-powered for mobility.

SUMMARY OF THE INVENTION

In accordance with one embodiment of the present invention, there is provided, a mobile computing resource without a built-in display or peripheral, so as to achieve low cost, portability, and flexibility. The mobile resource unit includes a computing unit having a motherboard, a central processing unit (CPU), a read-only memory (ROM), a random access memory (RAM), a basic input/output system (BIOS), and an operating system (OS) that is capable of executing computer processes. A wireless module may be provided in the mobile computing resource to provide wireless communication services. In one embodiment, a power source (e.g., a rechargeable battery pack) provides power to the computing unit, together with a power switch which allows the mobile resource unit to be powered on or powered off.

According to one embodiment, the computing unit of the mobile computing resource may be pre-installed with an OS and host or client applications for remote display. The mobile computing resource communicates with a client device to support the compatible client applications for remote display. Thus, the mobile computing resource provides additional computing power to a client device (e.g., a smart connected device), and displays its content on the client device remotely. In some embodiments, the mobile computing resource provides a higher power processor, provides functions needed by the client device—thereby reducing the cost of the client's display device—and shares the display and other peripherals in the client devices. Further, the mobile computing resource may also provide a backup battery function to the client device through a direct connection or through wirelessly charging.

The present invention thus provides the advantages of a flexible, low-cost mobile computing resource without incurring the costs of a display and other peripherals. Such a mobile computing resource may be handheld, and of a size capable of being carried in a shirt pocket, thereby enjoying the great mobility that cannot be achieved in a conventional server computer. The mobile computing resource may work with any type of client devices that support compatible server or client function to form a "mobile local cloud" through a local network connection or a direct connection. The mobile computing resource is a portable high-power computing resource to the paired simple client device available whenever needed, especially for such applications as Augmented Reality display and gesture operations. The mobile computing resource shares a power source with the client device, and may provide a backup battery charging function (through an optional rechargeable battery) to the client device.

In some embodiments, the mobile computing resource may provide a next-generation or a higher power CPU or OS to the client device, without requiring upgrade to the client device. This is achieved when the mobile computing resource includes a more powerful CPU than the client device's CPU, or when the OS in the mobile computing resource (e.g., Windows) is considered more powerful than the OS (e.g., Android or an Apple-based OS) in the smartphone or tablet client device. The mobile computing resource and the client device together becomes a new hybrid entity. The mobile computing resource may also provide a later or more advanced version of the OS that is in the client device.

The present invention is better understood upon consideration of the detailed description below in conjunction with the accompanying drawings.

BRIEF DESCRIPTION OF THE DRAWINGS

For purposes of clarity and brevity, like elements and components bear the same designations and numbering throughout the Figures.

DESCRIPTION OF THE PREFERRED EMBODIMENT

Figure 1:
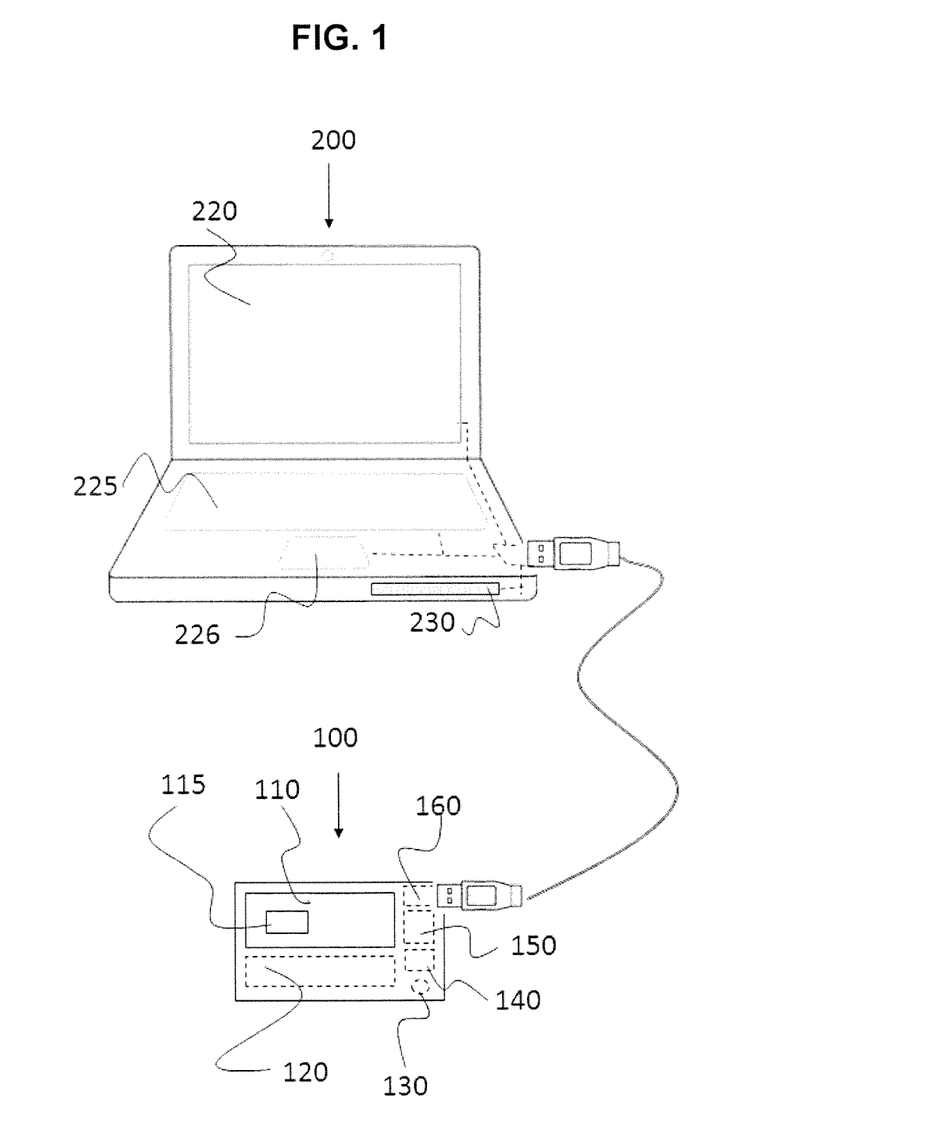
FIG. 1 shows mobile computing resource 100 directly connected to client device 200, in accordance with one embodiment of the present invention.

FIG. 1 shows mobile computing resource 100 directly connected to client device 200, in accordance with one embodiment of the present invention. As shown in FIG. 1, mobile computing resource 100 is a simple device without a display, optional battery pack 120, or peripherals. Mobile computing resource 100 may be a handheld device which includes computing unit 110 and a motherboard containing its principal components, e.g., a CPU, a graphical processing unit (GPU), ROM, RAM, a storage unit, wireless module 115, firmware, and an operating system. In FIG. 1, computing unit 110 of mobile computing resource 100 is paired with client device 200 (e.g., a laptop computer) directly through a cable with USB 3.1 electrical connectors. Such a connection may provide a power interface, a data interface, a video interface, and a control interface. The data interface may include an input interface and an output interface sharing the data interface. In other embodiments, computing unit 110 of mobile computing resource 100 may connect with client device 200 over a wired network or wirelessly using a wireless interface (e.g., Wi-Fi-direct, i.e., without a wireless access point).

In one embodiment, computing unit 110 of mobile computing resource 100 and client device 200 follow pre-defined roles for each other based on the other device's resource, content, and services requirements. In one embodiment, client device 200 provides a power source to mobile computing resource 100, when mobile computing resource 100 is not equipped with a rechargeable battery pack. Computing unit 110 may take control of client device 200's peripheral interfaces, providing output data over a data interface or a video interface to client device 200's output device (e.g., electronic visual display 220) and receiving input data from client device 200's input device (e.g., keyboard 225) over the data interface or the video interface, thereby integrating with client device 200 with mobile computing resource 100 to form an integrated computing unit. For example, suppose client device 200 is a laptop computer known as a Chromebook, and computing unit 110 runs the Microsoft Windows 8 pocket PC. As shown in FIG. 1, client device 200 provides a power source to mobile computing resource 100 through battery 230. By coupling with mobile computing resource 100, client device 200 becomes a "new" high-power Windows 8 laptop computer, with mobile computing resource 100 taking control over electronic visual display 220 and keyboard 225, mouse, touchpad 226, and a touch screen (for receiving input data).

In one embodiment, mobile computing resource 100 has a power module that supplies power to computing unit 110. Alternatively, client device 200 may feed electrical power to mobile computing resource 100 through USB 3.1 electrical connector 160. In another embodiment, the power module can be optional rechargeable battery pack 120, or a DC power source. In another embodiment, optional AC DC power jack 140 is provided for charging battery pack 120. In one embodiment, power button 130 allows mobile computing resource 100 to be powered on or powered off. In one embodiment, mobile computing resource 100 can charge client device 200 through an electrical connector when optional rechargeable battery pack 120 is present.

In one embodiment, computing unit 110 connects and interacts with client device 200 through a wired network or wirelessly. The communication link can be achieved through any of the following protocols: network peer-to-peer, network client and server, network master and slave, remote desktop, remote procedure call, package protocol or communication models, and other applications. Through such a connection, mobile computing resource 100 takes control over electronic visual display 220 and keyboard 225, mouse, touchpad 226, and a touch screen (for receiving input data).

In one embodiment, computing unit 110 may run host or client applications, or master or slave application for remote display. Computing unit 110 and its firewall may be opened to client device 200 to support compatible client application for remote display. In one embodiment, client device 200 runs a compatible client side application. In one embodiment, client device 200 displays the contents created by mobile computing resource 100 (e.g., in conjunction with executing one of its application programs) In one embodiment, optional display connector 150 (e.g., such as HDMI or DisplayPort) allows mobile computing resource 100 to connect an external display, when desired. In one embodiment, a wireless battery charger may be provided to charge battery pack 120. In one embodiment, an external battery charging station is provided to charge removable battery pack 120.

Figure 2:
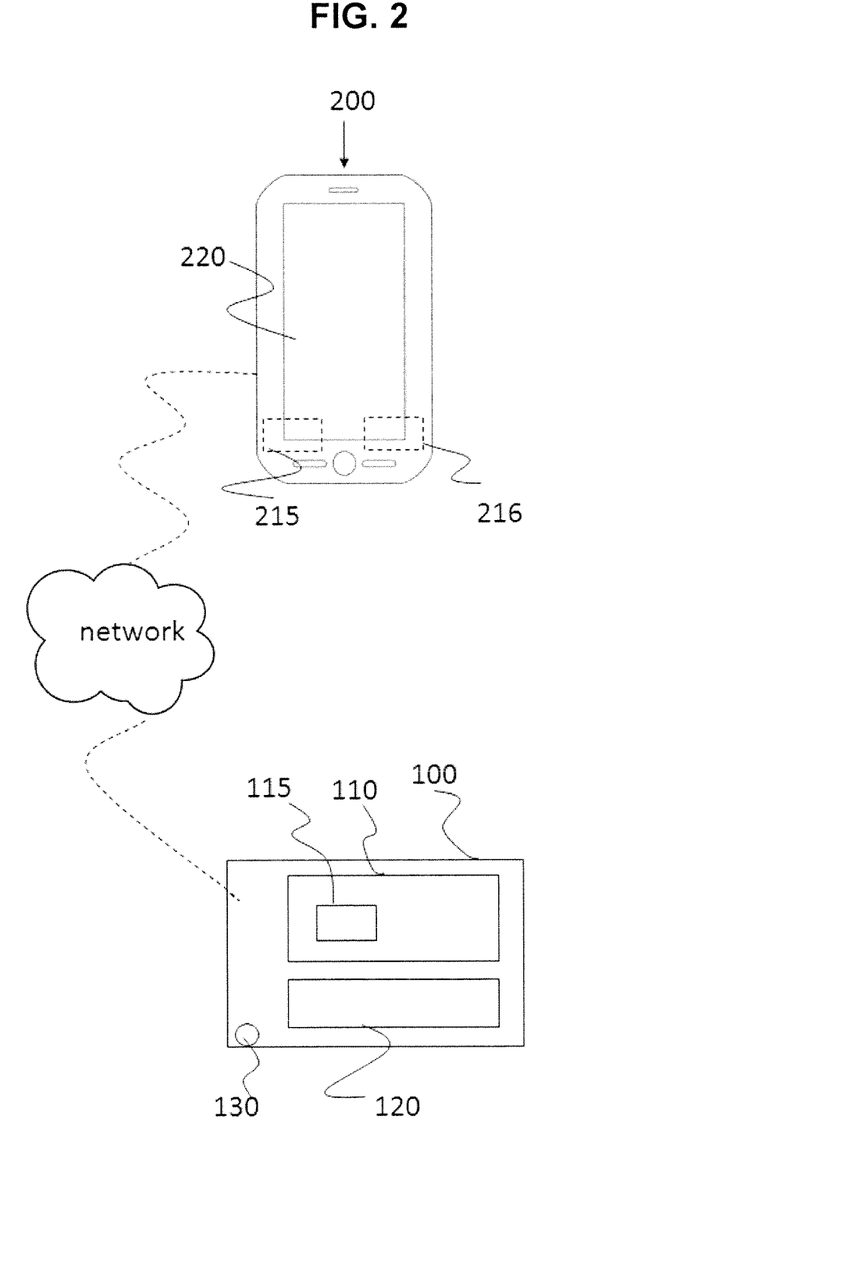
FIG. 2 shows mobile computing resource 100 connected to client device 200 over a computer or communication network, in one embodiment of the present invention.

FIG. 2 shows mobile computing resource 100 connected to client device 200 over a communication computer network, in one embodiment of the present invention. In one implementation, mobile computing resource 100 runs the Microsoft Windows 8 operation system installed on it, along with a Microsoft Remote Desktop server or host application. To provide an access mechanism, mobile computing resource 100 has been assigned a unique name as a server, and has registered therein one or more user accounts each accessible through a username and a password. When powered on and connected to a public communication or computer network, mobile computing resource 100 connects to a router through wireless module 115 and becomes accessible through the communication or computer network. At that point, client device 200 (e.g., an Android- or Apple-based smartphone or tablet device) which has a Microsoft Remote Desktop client application installed on it, may connect to mobile computing resource 100 though client wireless module 215. Client device 200 runs the Microsoft Remote Desktop client application to connect to mobile computing resource 100, using its assigned device name, and the user name and password of one of the registered accounts. Once connected, the user can review the computing resources on mobile computing resource 100 using electronic visual display 220, and may control mobile computing resource 100 from client device 200. In one embodiment, client device 200 displays the contents created by mobile computing resource 100 (e.g., in conjunction with executing one of its application programs) By this process, client device 200 accesses to the computing resources of a powerful Windows 8 device. The user may enjoy both the advantages of both Windows and Android systems by connecting client device 200 to the pocket-size mobile computing resource 100.

In one embodiment, a 3G/4G communication service-enabled client device 200 may serve as a mobile hotspot. In one implementation, mobile computing resource 100 runs Microsoft Windows 8 operation system and Microsoft Remote Desktop server or host application, and client device 200 runs a Microsoft remote desktop client application. Client device 200 and mobile computing resource 100 may be connected in the manner described above, using mobile computing resource 100's assigned server name, together with access enabled through the registered user account credentials.

Alternatively, mobile computing resource 100 may include a built-in display connector 150, which allows a user to connect an external display and an input device. Using this arrangement, a user may configure mobile computing resource 100 (e.g., assigning a device name, and setting user accounts accessible using a user name and a password). Mobile computing resource 100 may be configured to connect to a private computer or communication network (e.g., using a secure password, if required). When connected to the private communication or computer network, one or more client devices (e.g., client device 200) can access the computing resources of mobile computing resource 100.

In yet another embodiment, mobile computing resource 100 runs a UNIX-based operating system (e.g., Linux) and a UNIX-based remote display server. A client device (e.g., Client device 200) having compatible remote display client software installed may connect to mobile computing resource 100, based on the access mechanism described above.

Figure 3:
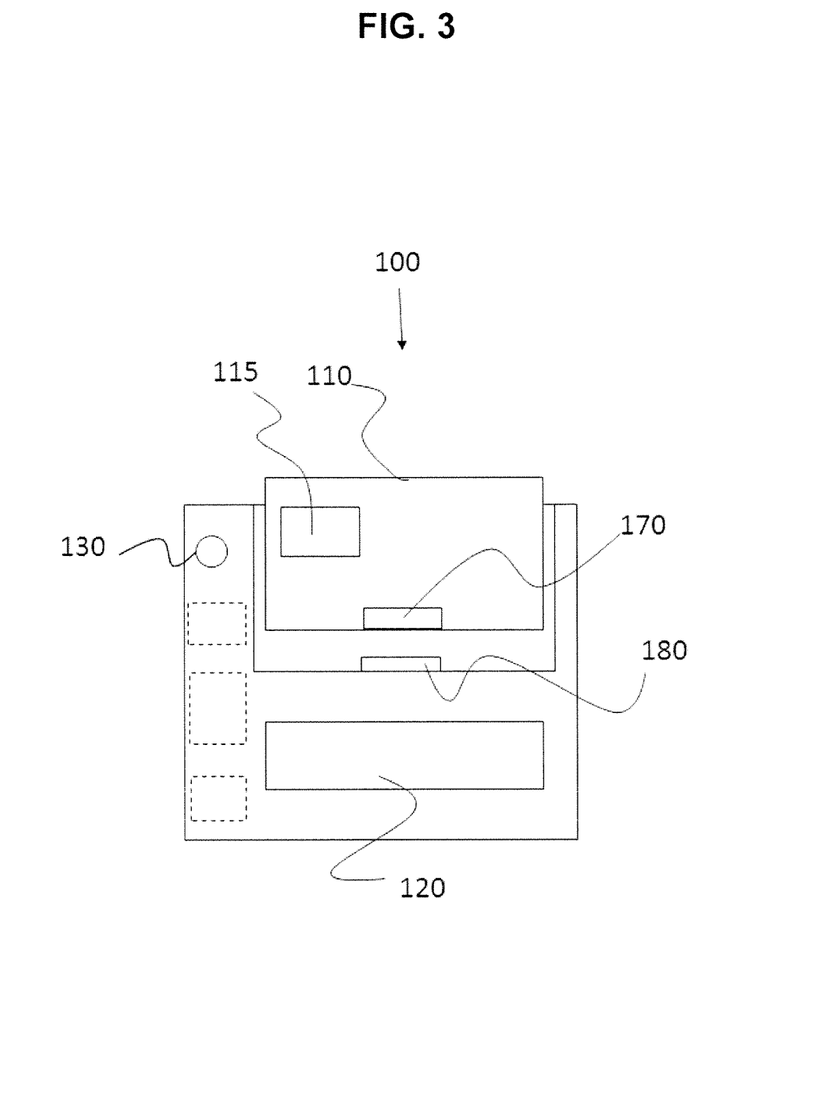
FIG. 3 is a top view of mobile computing resource 100 which may include a swappable computing unit 110, according to one embodiment of the present invention.

FIG. 3 is a top view of mobile computing resource 100 which may include a swappable computing unit 110, according to one embodiment of the present invention. As shown in FIG. 3, computing unit 110 and wireless module 115 can be a swappable, handheld-sized modular pocket PC that can be accepted into a customized slot of mobile computing resource 100. In one embodiment, the modular pocket PC of computing unit 110 is provided a connector (e.g., a female connector) designed to be coupled to a corresponding connector (e.g., male connector) provided in the housing of mobile computing resource 100. The pocket PC of computing unit 110 can be detached from mobile computing resource 100. In one embodiment, the pocket PC of computing unit 110 is powered by mobile computing resource 100 when computing unit 110 is connected by the male and female connectors. In that configuration, mobile computing resource 100 is available for connection by one or more client devices (e.g., client device 200).

Figure 4A:
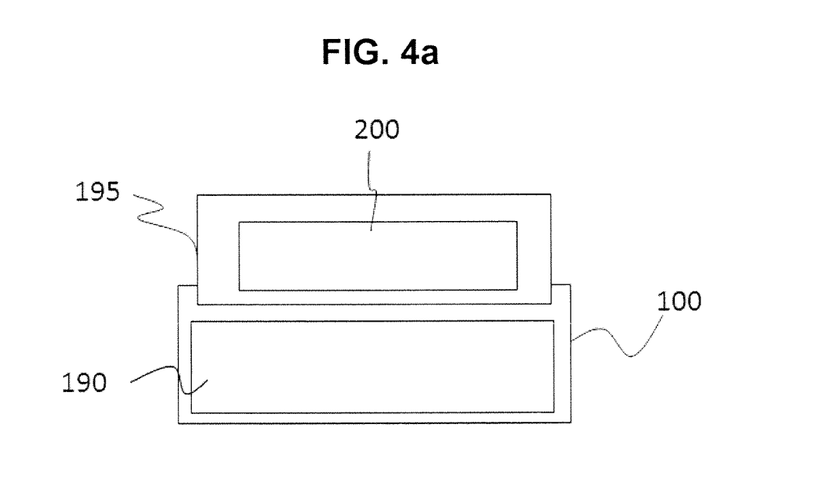
FIG. 4a is a top view of mobile computing resource 100 having integrated input unit 190, and client holder 195 for accommodating a client device (e.g., client device 200) in an "open state", according to one embodiment of the present invention.

FIG. 4a is a top view of mobile computing resource 100 having integrated input unit 190, and client holder 195 for accommodating a client device (e.g., client device 200) in an "open state", according to one embodiment of the present invention. The "open state" refers to the state when integrated input unit 190 is slid out of the housing of mobile computing resource 100 and becomes visible by the user. In contrast, the "close state" refers to the state in which integrated input unit 190 is slid inside of the housing of mobile computing resource 100, being covered by client holder 195. In one embodiment, in the close state, client holder 195 hides integrated input unit 190 entirely. In one embodiment, the open state is entered when client holder 195 slides up to expose integrated input unit 190 to allow a user to enter commands. In one embodiment, mobile computing resource 100 connects to client device 200 wirelessly. Integrated input unit 190 may connect to client device 200 wirelessly through, for example, Bluetooth or Wi-Fi protocols. When operating in the wireless mode, client holder 195 may be detached from the housing of mobile computing resource 100. In one embodiment, client device 200 needs not be attached to client holder 195 while operating in the wireless mode.

Figure 4B:
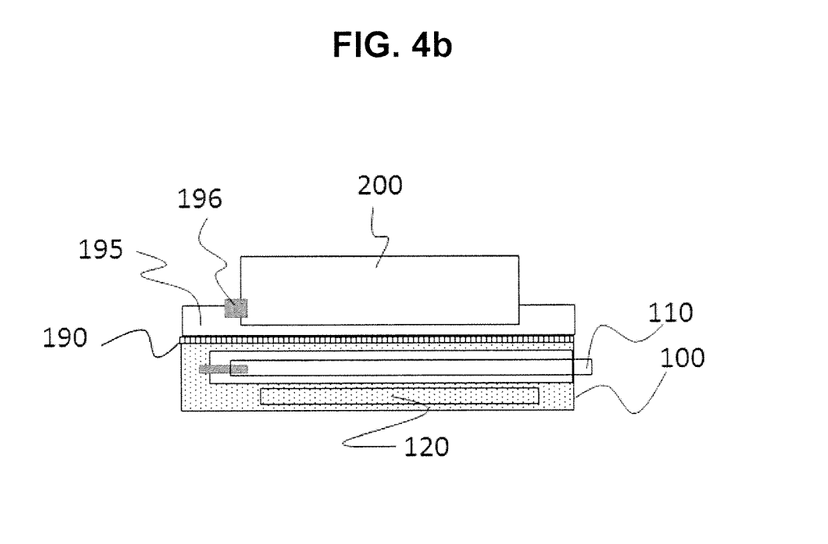
FIG. 4b is a cross section view of mobile computing resource 100 having integrated input unit 190 and client holder 195 for accommodating client device 200, in accordance with one embodiment of the present invention.

FIG. 4b is a cross section view of mobile computing resource 100 having integrated input unit 190 and client holder 195 for accommodating client device 200, in accordance with one embodiment of the present invention. FIG. 4b shows mobile computing resource 100 in the close state. In one implementation, the housing of mobile computing resource 100 is integrated with a battery and serves as a protective housing for computing unit 110. In one implementation, integrated input unit 190 is provided on one side of mobile computing resource 100 and may include, for example, a keyboard and a touchpad. In one embodiment, integrated input unit 190 may include a set of gaming control buttons and a joystick. In one embodiment, integrated input unit 190 includes a touch-enabled screen or pad. In one embodiment, client holder 195 includes client connector 196 which mates with a corresponding connector on client device 200, so as to allow a direct communication link to be established by the connectors. In one embodiment, client connector 196 implements power pins and supports at least one of following standard protocols or interfaces: USB, HDMI, DisplayPort, Thunderbolt, I2C and other industrial communication standards.

Figure 5:
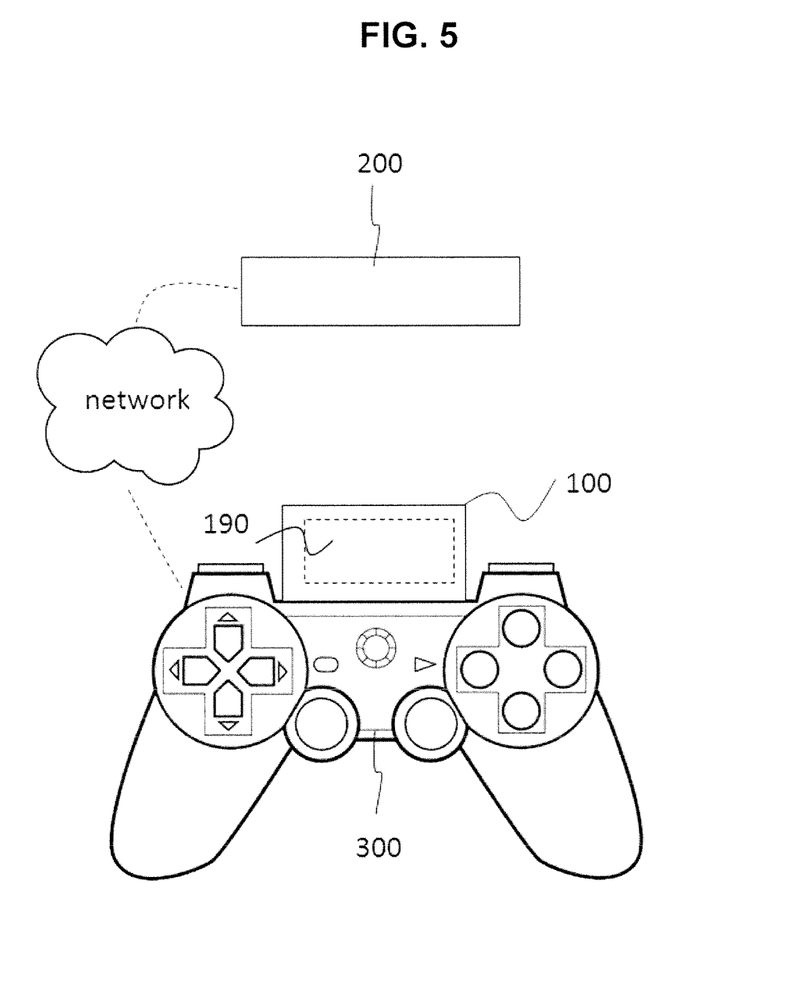
FIG. 5 illustrates one application of mobile computing resource 100, in accordance with one embodiment of the present invention.

FIG. 5 illustrates one application of mobile computing resource 100, in accordance with one embodiment of the present invention. As shown in FIG. 5, mobile computing resource 100 is mounted on actuator 300 (e.g., a game controller) of client device 200 through a clip or hook provided on the housing of mobile computing resource 100. In one implementation, mobile computing resource 100 may run the Windows OS, while client device 200 (e.g., a game console) may run the Android OS. Using any one of the access mechanisms described above, mobile computing resource 100 is connected to client device 200. In that configuration, a user may run a game on the Windows OS on mobile computing resource 100, while displaying graphical images on client device 200's display and interacting with the game through client device 200's actuator 300. In one implementation, mobile computing resource 100 may be provided optional integrated input unit 190 to allow a user to input data, when needed. In one embodiment, actuator 300 includes a slot to accommodate mobile computing resource 100 (e.g., modular pocket PC of FIG. 3). In one embodiment, mobile computing resource 100 is embedded in actuator 300. In one embodiment, actuator 300 may be implemented in the form of a keyboard, a stationary stand, an electronic toy, an electronic stuffing animal, a camera, an electronic flying device, or any other suitable device.

Figure 6:
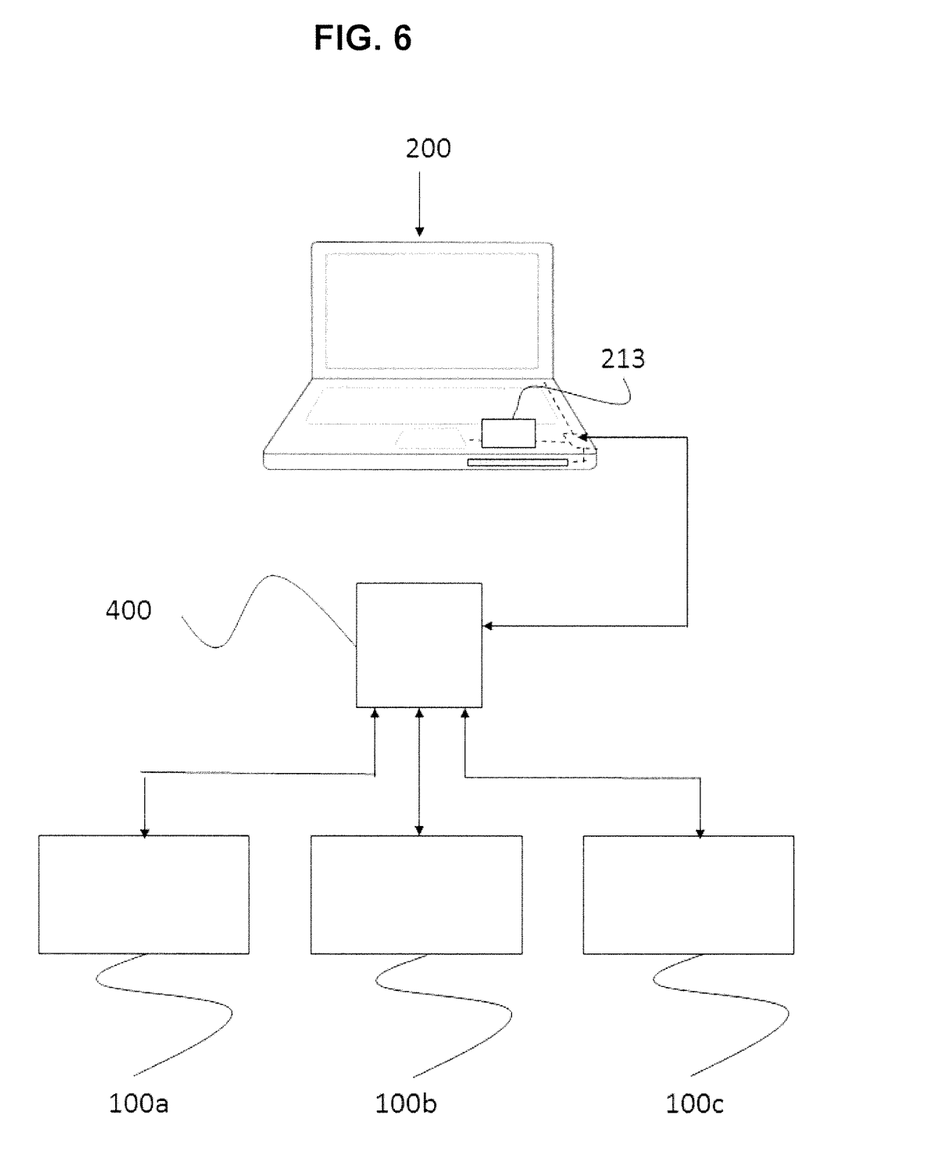
FIG. 6 shows multiple mobile computing resources 100a-100c connected to client device 200 through data hub 400, according to one embodiment of the present invention.

FIG. 6 shows multiple mobile computing resources 100a-100c connected to client device 200 through data hub 400, according to one embodiment of the present invention. Each of mobile computing resources 100a-100c, data hub 400, and client device 200 may use the same type of connector for carrying data, video, power and optionally other control interfaces. Data hub 400 has multiple ports for connecting multiple mobile computing resources (e.g., mobile computing resources 100a-100c), and a host port for connecting client device 200. In this configuration, client device 200 acts as a host system to access each of mobile computing resources 100a-100c through its control unit 201. Mobile computing resources 100a-100c may have, however, different processors and different operating systems. In one implementation, data hub 400 may be a USB 3.1 hub, which delivers up to 5 A and 100 W power to the connected devices. In one embodiment, data hub 400 repackages the audio, video and data packages from each of mobile computing resources 100a-100c into the same selected data format prior to forwarding to client data hub 213 of client device 200 for processing. A USB 3.1 application may be provided on client device 200 to allow a user to display information regarding each of connected mobile computing resources 100a-100c, and to access to any of mobile computing resources 100a-100c at will. In the configuration of FIG. 6, client device 200 may be, for example, a Google Chrome laptop, and mobile computing resources 100a-100c may run, for example, Windows 8, Android, and iOS operating systems, respectively. According to one embodiment of the present invention, takeover control module in client device 200 allows any of mobile computing resource 100a-100c to control operations in client device 200. In one implementation, a virtue KVM switch implements takeover control module 225, so as to allow each of connected mobile computing resources 100a-100c, when engaged, to access a keyboard, a video display, and a mouse of client device 200. In this manner, for example, client device 200 can become a Windows 8 laptop when the user engages mobile computing resource 100a through the virtue KVM switch. Mobile computing resource 100a may then output to the LCD display of client device 200, and receives input commands from the keyboard and a mouse of client device 200. In the same manner, client device 200 can become an Android laptop or an Apple MacBook by the user switching to mobile computing resources 100b and 100c, respectively. The virtue KVM switch of the present invention redirects video and data packages to a designated mobile computing resource without incurring additional hardware cost.

Figure 7:
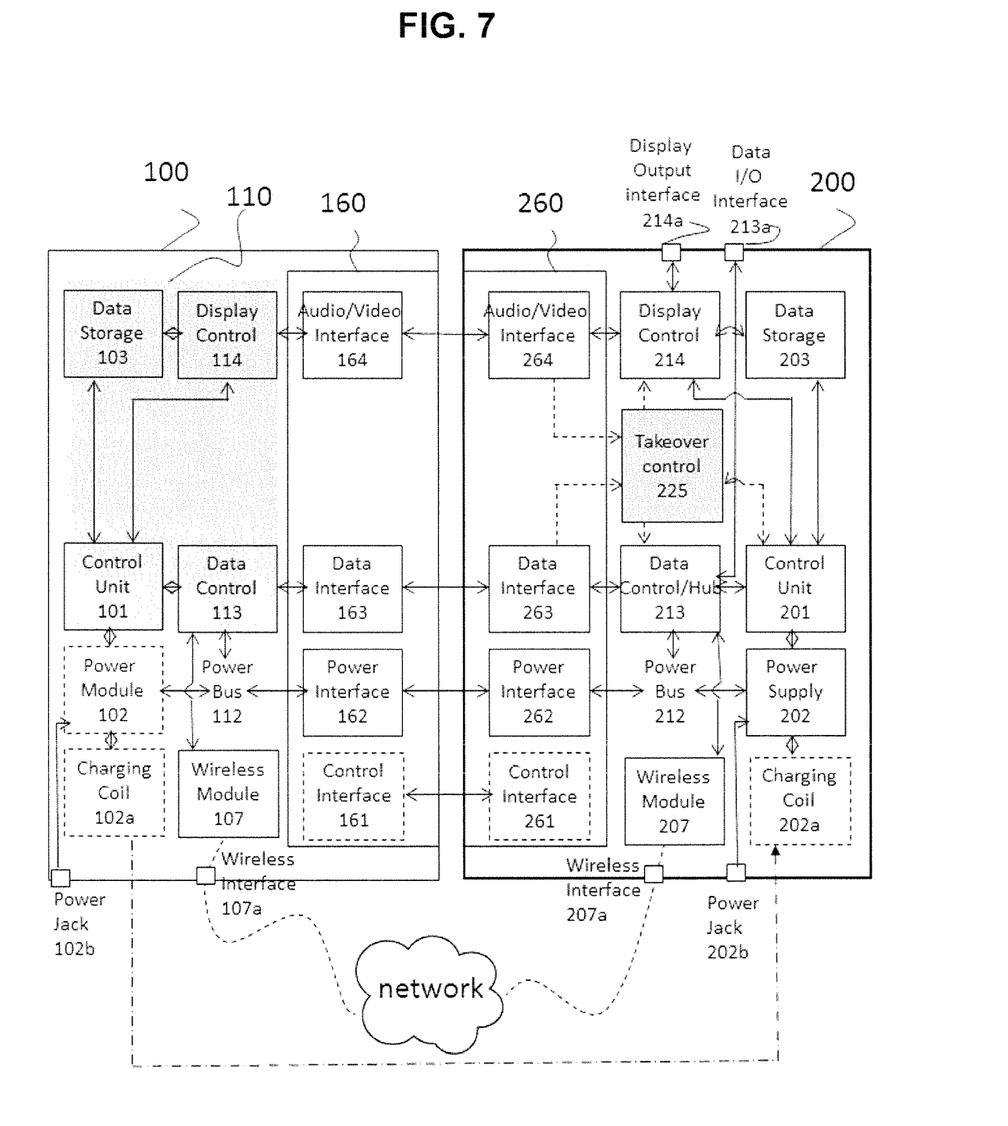
FIG. 7 is a block diagram showing functional blocks in mobile computing resource 100 and connected client device 200, according to one embodiment of the present invention.

FIG. 7 is a block diagram showing functional blocks in mobile computing resource 100 and connected client device 200, according to one embodiment of the present invention. As shown in FIG. 7, mobile computing resource 100 and client device 200 communicate over data, audio and video, power and optional control interfaces. These interfaces may be carried on one or more connectors at each device. In one implementation, mobile computing resource 100 may be a Microsoft Windows device, having computing unit 110 which includes data storage module 103. USB data control module 113, display control module 114 and control module 101 (e.g., an Intel multicore x86 processor). Control module 101 may be provided a program memory in which executable instructions may be stored. USB data control module 113 controls data ports and interacts with client data hub 213 through data interface 163, display control module 114 controls display ports and interacts with client display control module 214 through audio and video interfaces 164, and power bus 112 supplies power to all components in mobile computing resource 100. Power bus 112 may also supply power to or may receive power from client device 200 through power interface 162, when required. Computing unit 110 may also use wireless module 107 to send and receive data over an external communication or computer network. Optional power module 102 may be provided a rechargeable battery and may be connected to power jack 102b. Mobile computing resource 100 may alternatively initiate handshaking with client device 200 through data interface 163 and control interface 161.

Alternatively, takeover control module 225 may be implemented by an internal physical KVM switch, which may be controlled by an application program or its firmware. For example, a commercial video controller that supports multiple video streams can be used to provide a video KVM switch which directs any input stream, whether originating from mobile computing resource 100 or client device 200, to display control module 214 and video controller output display interface 214a.

On the side of client device 200, control unit 201 may be implemented by a simple processor (e.g., an ARM processor), which may have an embedded program memory from which to execute commands. Control unit 201 coordinates with mobile computing resource 100 and control internal operations in client device 200. As shown in FIG. 6, client device 200 includes data storage module 203, USB data control module 213, which controls data ports 213a and interacts with resource's data control 113 through data interface 263, and display control module 214, which controls display ports. In other embodiments, client device 200 may also include a display and touch panel module (not shown), and an audio module to control a microphone and a speaker. Client display control module 214 interacts with mobile computing resource 100's display control module 114 through audio and video interfaces 264. Client device 200 may also include power supply module 202, which is connected to power jack 202b and supplies power over power bus 212 to all components. A battery in client device 200 may be used to provide power to mobile computing resource 100 over power interface 262. Power interface 262 interacts with corresponding power interface 162 to supply power from or to provide power to mobile computing resource 100, when required. Wireless module 207 may be used to send and receive data over an external communication or computer network.

In one embodiment, mobile computing resource 100 may include power module 102 and a rechargeable battery (not shown), which may be charged or discharged inductively through charging coil 102a. Mobile computing resource 100 may thus serves as a base charging station. Client device 200, which may also include power supply module 202 and a rechargeable battery, may be charged or discharged through client charging coil 202a. When power level is low at client device 200, a user may place mobile computing resource 100—in particular, charging coil 102a—over charging coil 202a of client device 200. Mobile computing resource 100 may therefore charge the rechargeable battery in client device 200 by electromagnetic induction.

Figure 8:
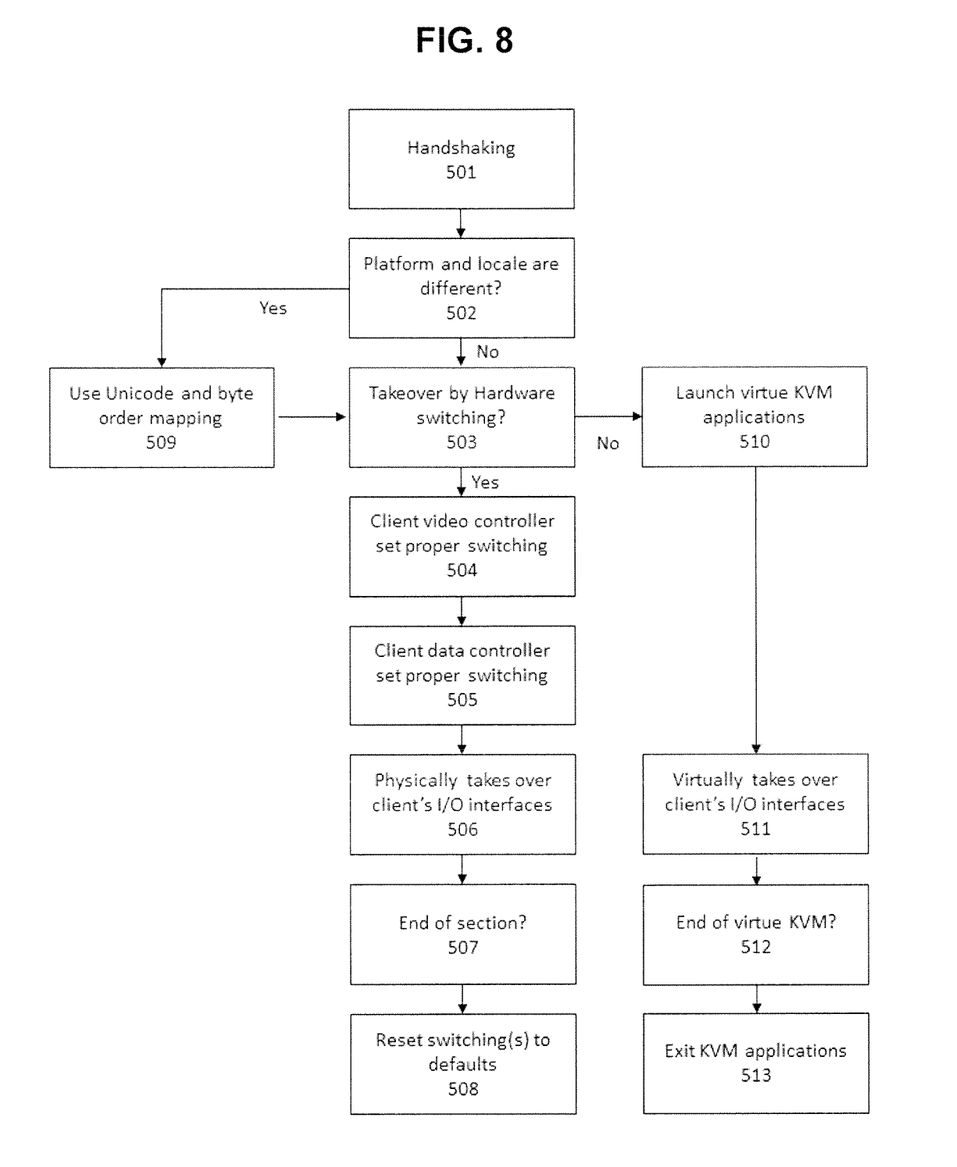
FIG. 8 is a flow chart illustrating an operational flow between client device 200 and mobile computing resource 100, in accordance with one embodiment of the present invention.

FIG. 8 is a flow chart illustrating an operational flow between client device 200 and mobile computing resource 100 ("the devices"), in accordance with one embodiment of the present invention. As shown in FIG. 8, at step 501, the devices each launch a pre-installed application to initiate connection via a predetermined handshaking protocol through their respective control interface 161 and client control interface 261. (Alternatively, connection in step 501 may be effectuated wirelessly using wireless module 107 and client wireless module 207, as described above in conjunction with FIG. 7). The devices may assume any host/client, master/slave, or server/client relationship, as required. At step 502, the devices exchange platform and locale information so as to allow data to be exchanged over proper format. In heterogeneous computer systems, at step 509, the devices may need to negotiate a common format for data exchange. The locale information may be a set of parameters that define the user's language, country and any special variant preferences that the user desires for the user interface. For example, a locale identifier may include a language identifier and a region identifier. In one embodiment, mobile computing resource 100 may be set up for the U.S. English language, while client device 200 may be set up for the Chinese language from Taiwan. Similarly, mobile computing resource 100 may be set up for handling ASCII codepage, while client device 200 may be set up for handling Big 5 codepage. At step 509, the devices may agree on a Unicode codepage to serve as a bridge for the communication. The devices then encode and decode their codepages into Unicode accordingly.

Once a proper communication protocol is settled upon, at step 503, the devices agree on a takeover mechanism. For example, in one embodiment, an internal physical KVM switch is available. At step 504, client device 200 selects an audio/video physical port on the KVM switch to allow mobile computing resource 100 to use the assigned port to control display control module 214 through video interface 264. To take over data control, client device 200 switches data hub 213 to a predefined port that connects data interface 263, so as to allow mobile computing resource 100 to takeover data hub 213. Once a proper switching is done, at step 506, mobile computing resource 100 takes over display interface 214*a* and data I/O interface 213*a* from client device 200. In one embodiment, at step 507, client device 200 may detect a termination of a physical connection in mobile computing resource 100. When that occurs, client device 200 resets its physical KVM to a default state at step 508.

Alternatively, a virtual KVM (i.e., a KVM service application), rather than a physical KVM, has become available at step 510. Client device 200 may launch the virtual KVM service application, if required. At step 511, mobile computing resource 100 takeover display control module 214 and data hub 213 from client device 200. The virtual KVM may have a lower performance than physical KVM switch, as data package is examined by client device 200 prior to performing proper data routing. At step 512, either device may end its virtue KVM service application or, alternatively, client device 200 may detect a termination the connection with mobile computing resource 100. When either event occurs, client device 200 exits the virtue KVM service application at step 513.

While the detailed description above illustrates herein specific embodiments of the present invention, various variations, modifications and changes are possible within the scope of the present invention. It is desired that the present invention is to be protected by the following claims in a Letters Patent.

What is claimed is:

1. A mobile computing resource for a client device, comprising:

a computing unit comprising a central processing unit (CPU), a random access memory, and a storage unit, the random access memory and the storage unit holding instructions for executing in the CPU an operating system and application programs during run time and for storage, respectively;

a plurality of peripheral interfaces each controlled by the computing unit for interfacing with and operatively controlling peripherals on the client device through a takeover control module in the client device, the takeover control module comprising either a physical internal KVM switch or a virtual KVM service application, the interfaces comprising one or more interfaces selected from the group consisting of a power interface, an input device interface, an output device interface, a mixed input or output device interface, a data interface, a video interface, a data or video alternative interface, a wireless interface, and a control interface; and a communication interface for engaging the client device, wherein the mobile computing resource has a form factor suitable for being handheld.

2. The mobile computing resource of claim 1, wherein the communication interface comprises one or more electrical connectors provided for carrying signals of one or more of the peripheral interfaces, the electrical connectors mechanically mating and electrically connecting to matching electrical connectors on the client device.

3. The mobile computing resource of claim 1, wherein the communication interface of the mobile computing resource engages the client device over a communication or computer network.

4. The mobile computing resource of claim 1, wherein the communication interface comprises a wireless module carrying signals of one or more of the peripheral interfaces to and from a wireless module on the client device.

5. The mobile computing resource of claim 1, wherein the wireless module is capable of communication using one or more protocols selected from the group consisting of Bluetooth, Wi-Fi, Radio Frequency, Near Field Communication, and cellular telecommunication network protocols.

6. The mobile computing resource of claim 1 wherein, when the client device is engaged, the takeover control module causes the peripherals on the client device to be controlled by the peripheral interfaces of the mobile computing resource.

7. The mobile computing resource of claim 6 wherein, when the client device is engaged, the computing unit provides output data over the data interface, the video interface, and the wireless interface to corresponding peripheral interfaces in the client device and receives input data over the data interface from a corresponding data interface in the client device.

8. The mobile computing resource of claim 1, wherein the mobile computing resource belongs to one of a plurality of mobile computing resource types and wherein the client device is configured to engage a mobile computing resource belonging to one of the mobile computing resource types.

9. The mobile computing resource of claim 8, wherein the client device is configured to engage two or more mobile computing resources each belonging to one of the mobile computing resource types.

10. The mobile computing resource of claim 1, wherein the computing unit has greater CPU performance than the client device.

11. The mobile computing resource of claim 1, wherein the computing unit provides computing and mass storage services for the client device.

12. The mobile computing resource of claim 1, wherein the communication interface engages the client device using one of: network peer-to-peer, network client and server, network master and slave remote desktop, direct host/client USB connection or communication models, remote procedure call, Miracast or DLNA, and package protocol or communication.

13. The mobile computing resource of claim 1, wherein the client/server, host/client or master/slave roles between the computing unit and the client device is determined by a handshaking negotiation between the computing unit and the client device at the time of engagement.

14. The mobile computing resource of claim 13, wherein the computing unit or client device playing the server, host or slave role opens up its firewall or access control to allow the device playing the client or master role to perform direct or remote access of its resources, content, or services.

15. The mobile computing resource of claim 1, wherein the client device is selected from the group consisting of: a cellular telephone, a digital personal assistant, a media, streaming or game player, a laptop computer, a pad or tablet computer, a desktop computer with a display, an electronic reader, a smart television or monitor, a mobile computing resource with a display, and an augmented reality device.

16. The mobile computing resource of claim 15, wherein the augmented reality device comprises one or more of: a head-mounted display device, a sensor, an eyeglass, a head-up display, contact lenses, a virtual retinal display, an EyeTap, a Spatial Augmented Reality device, a projection display, a gesture recognition device or module, and a computing platform.

17. The mobile computing resource of claim 1, wherein the computing unit displays content on an electronic visual display of the client device.

18. The mobile computing resource of claim 1, wherein the mobile computing resource further comprises a display device and wherein, when the client device is engaged, content from the client device is displayed on the display device of the mobile computing resource.

19. The mobile computing resource of claim 1, further comprising a power module for providing power to the computing unit.

20. The mobile computing resource of claim 19, wherein the power module comprise one or more of: a rechargeable battery pack, an AC/DC charger accessible through one of the peripheral interfaces, a DC power source from the client device, and a DC power from another apparatus or device.

21. The mobile computing resource of claim 19, further a comprising a primary coil for inducing a current in a secondary coil in the client device configured for charging the client device, so that the mobile computing resource services as an inductive charger to the client device.

22. The mobile computing resource of claim 1, wherein the computing unit charges the client device through a connector when the client device is engaged.

23. The mobile computing resource of claim 1, the mobile computing resource being configured to be accommodated in a housing or structure that is configured to hold both the mobile computing resource and the client device.

24. The mobile computing resource of claim 23, wherein the mobile computing resource is detachably accommodated in a slot in the housing or structure.

25. The mobile computing resource of claim 23, wherein the mobile computing resource is detachably accommodated in a slide-able structure in the housing or structure.

26. The mobile computing resource of claim 23, wherein the mobile computing resource, when accommodated in the housing or structure, is provided access to a power module.

27. The mobile computing resource of claim 23, wherein the mobile computing resource, when accommodated in the housing or structure, is connected to an input device interface.

28. The mobile computing resource of claim 27, wherein the input device interface comprises an interface selected from the group consisting of: a keyboard, a set of control buttons, a joystick, a touchable structure, and a gesture recognition module.

29. The mobile computing resource of claim 1, wherein the computing unit has lesser CPU performance than the client device.

30. The mobile computing resource of claim 1, wherein the computing unit is configured to be accommodated in a housing or structure of the mobile computing resource.

31. The mobile computing resource of claim 13, wherein an authentication process is applied at handshaking which authenticates the computing unit to the client device, and vice versa, using an authenticating entity.

32. The mobile computing resource of claim 31, wherein the authentication process is selected from the group consisting of: Challenge-Handshake Authentication Protocol (CHAP), Media Access Control Address (MAC address), or private identity protocol.

* * * * *